No. 677,904. Patented July 9, 1901.
M. A. THREEHOUSE.
SPECTACLE CASE.
(Application filed Jan. 9, 1900.)
(No Model.)
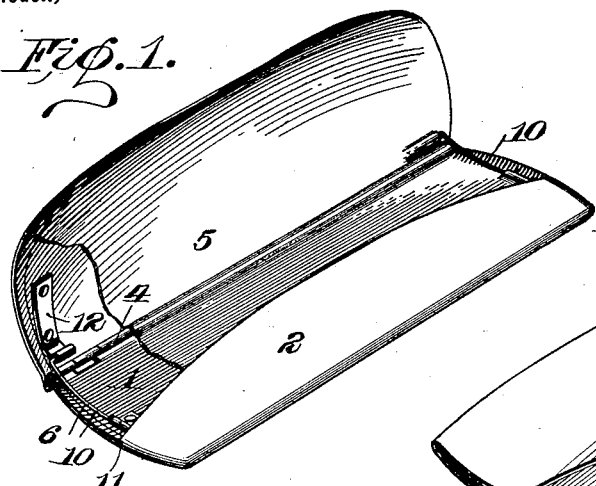
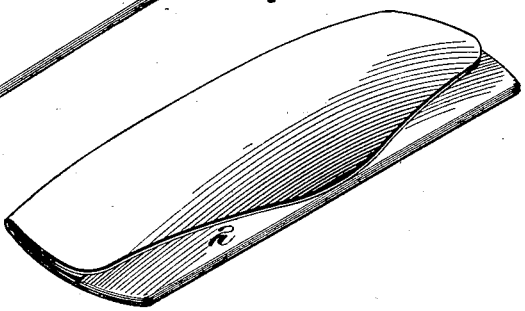
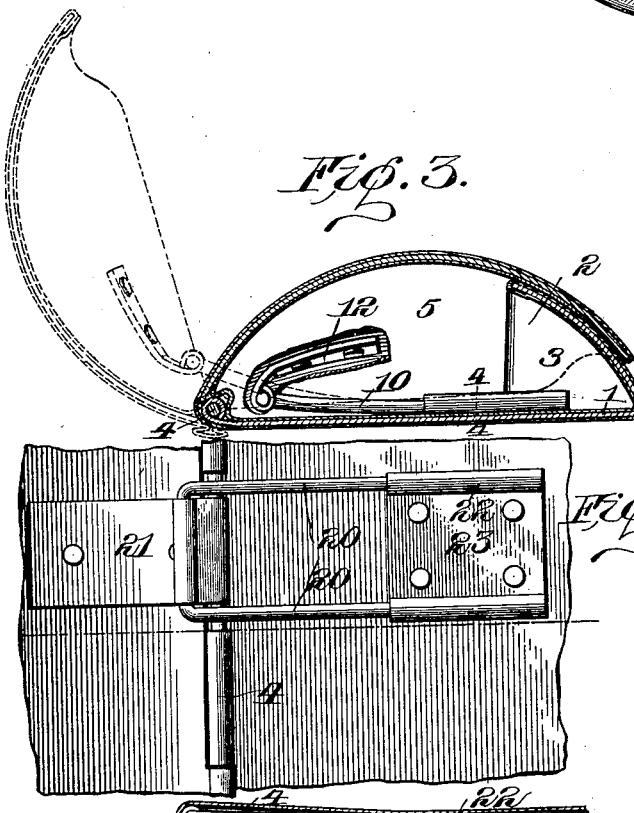
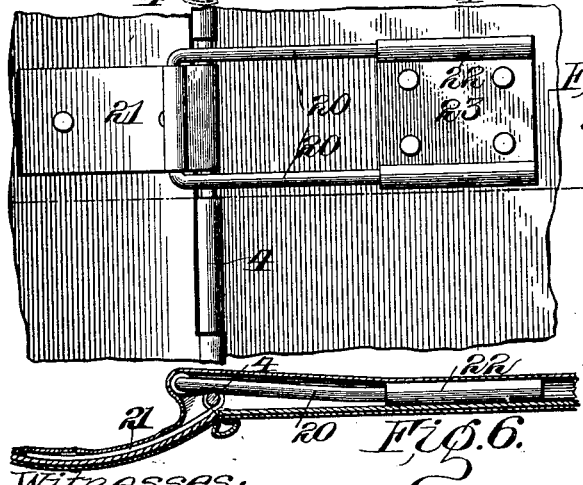
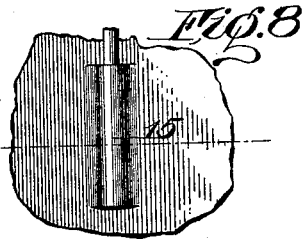
Witnesses:
Walter B. Payne.
G. Willard Rich.
Inventor;
Mortimer A. Threehouse
by Church & Church
his Attorneys.
THE NORRIS PETERS CO., PHOTO-LITHO., WASHINGTON, D. C.

UNITED STATES PATENT OFFICE.

MORTIMER A. THREEHOUSE, OF ROCHESTER, NEW YORK, ASSIGNOR TO E. KIRSTEIN SONS COMPANY, OF SAME PLACE.

SPECTACLE-CASE.

SPECIFICATION forming part of Letters Patent No. 677,904, dated July 9, 1901.

Application filed January 9, 1900. Serial No. 876. (No model.)

*To all whom it may concern:*

Be it known that I, MORTIMER A. THREEHOUSE, of Rochester, in the county of Monroe and State of New York, have invented certain new and useful Improvements in Spectacle-Cases; and I do hereby declare the following to be a full, clear, and exact description of the same, reference being had to the accompanying drawings, forming a part of this specification, and to the reference-numerals marked thereon.

My present invention relates to cases for eyeglasses or spectacles, and has for its object to provide a suitable receptacle and cover therefor, and, further, to provide a connection between the parts adapted to retain the case in either an open or closed condition which shall be simple in construction and automatic in operation without occupying an unnecessary amount of space within the case.

To these and other ends the invention consists in improvements in construction and combinations of parts, all as will be hereinafter fully described and the novel features pointed out in the claims at the end of this specification.

In the drawings, Figure 1 is a perspective view of a case constructed in accordance with my invention, a portion of the lining being broken away to more clearly show the arrangement of the parts; Fig. 2, a similar view showing the case closed; Fig. 3, a cross-sectional view through one end of the case, illustrating the operation; Fig. 4, a similar view on the line 4 4 of Fig. 3; Figs. 5 and 6, plan and sectional views of central portions of a case, showing a modification; Fig. 7, a cross-sectional view similar to Fig. 4, illustrating another method of construction; Fig. 8, a plan view of the same.

Similar reference-numerals in the several figures indicate similar parts.

In constructing my case I employ two members hinged together, one preferably consisting of the base or body portion embodying the bottom 1, having upon one edge a lip or overhanging portion 2, forming a pocket 3, and at the rear edge is a hinge connection 4, between the base and the other member, 5, constituting the cover. The ends of the body are bent upward slightly, as shown at 6, and the cover is preferably made convex in form and adapted to close over the lip 2 to afford a sufficient space to contain either eyeglasses or spectacles without injury to either the lenses or frame of the latter. It is desirable in cases of this kind to provide a simple and effective means which will retain the cover of the case in a closed position upon the base or body and at the same time to permit the case to be easily opened and to retain the latter in open position until closed by the operator. To accomplish these objects in a simple and cheap manner, I employ one or more spring-arms having a loose pivotal connection with one member and a sliding connection with the other, the said pivotal connection being capable of moving across the line of the hinge-center between the members in such manner that the elasticity of the arms will hold the members both open and closed. In the preferred form of my invention (shown in Figs. 1 and 3) I arrange near each end of the case spring-arms 10, preferably of wire, pivotally connected to the member or cover 5 a short distance from the hinge by plates or arms 12, having eyes in which the laterally-extended ends of said springs may freely rotate, and provide upon the other member, such as the base or body 1, guides or eyes 11, in which the spring-arms are adapted to slide when the members are opened and closed. When the case is closed, as in full lines in Fig. 3, the spring-arms, operating forward of the hinge 4, hold the parts together, and when they are moved to open the case the spring-arms slide outward in the guides 11, and they are flexed as their pivotal point of connection with the member 5 rises, and when said point passes to the rear of the hinge 4 said arms will tend to force the member down, and thereby hold the casing open, as in Fig. 1 and in dotted lines in Fig. 3. The casing may be readily closed when desired, and when the pivot of the spring is moved across the hinge-center said springs will hold the parts yieldingly together, as will be readily understood. The arms 10 may be constructed, as shown, of spring-steel wire, and the guides 11 and the clips or hinges 12 constructed of separate pieces and riveted or otherwise secured to the parts of the case, or the separate pieces may be dispensed with where the cases are constructed of sheet metal, and the latter may be formed by striking up looped portions 15 in the metal, as shown in Fig. 7.

In Fig. 5 I have shown a modification of my device in which the spring-arms 20 are arranged midway between the ends of the case, and in this construction the arms are formed from a single piece of material bent into a U shape and secured to one member by a single clip 21, the free ends operating in the guides 22, formed at the opposite sides of a clip 23, attached to the other member of the casing.

Various modifications other than those I have shown will suggest themselves to those skilled in the art without departing from the spirit of my invention; but I prefer to employ the form shown in Fig. 1, in which the spring arms or members are applied at the ends of the case, as in this position they may be arranged just inside of the slightly-upturned ends, where they are less conspicuous. By constructing the spring-arms of wire, as shown, the device presents a neat and workmanlike appearance, and if for any reason it becomes necessary to replace the arms their location at the ends of the case will permit the change without damage to the case or unnecessary injury to the lining; but I do not desire to confine my invention to any particular kind or number of springs.

Cases constructed according to my invention are simple and compact, and owing to the few parts the entire device may be constructed of aluminium or other light metal and provided with the usual covering and lining, making a case that is light and compact and one in which eyeglasses or spectacles will be thoroughly protected.

I claim as my invention—

1. In a case for eyeglasses, &c., the combination with the two members hinged together, of the spring-arm pivoted to one member on a center substantially parallel with that of the hinge and guided and confined to slide upon the other in a direction transversely of the hinge-pivot, the said pivotal connection of the spring being movable across the hinge-pivot.

2. In a case for eyeglasses, &c., the combination with the two members hinged together, of a spring-arm loosely pivoted to one member on a center substantially parallel with that of the hinge and at a point removed from the hinge, and guided to move longitudinally upon the other member transversely of the hinge, the pivotal connection of the arm being moved across the hinge-pivot as the members are opened and closed.

3. The combination with the two members hinged together, of a spring-arm extending at right angles to the axis of the hinge and connected to one member, and the guide on the other member also extending at right angles to the axis of the hinge and in which the spring-arm operates longitudinally, as the members are opened and closed.

4. The combination with the two members hinged together, of a spring-arm extending transversely of the hinge-pivot, the loose hinged connection between the arm and one of the members, and the guide on the other member embracing the arm and through which the latter is permitted to slide longitudinally.

5. In an eyeglass or spectacle case, the combination with two hinged members, of the guide on one of the said members, the spring-arm sliding in the guide transversely of the hinge and loosely pivoted to the other member near the hinge on a center parallel with that of the hinge, whereby the end of the spring will be carried over the hinge-center, when the members of the case are opened or closed, and its spring action exerted to hold them in either position.

6. In an eyeglass or spectacle case the combination with a member or receptacle having the bottom and a second member or cover hinged thereto, of the spring-arms arranged at the ends of the case and extending at right angles to and across the axis of the hinge when the case is open said arms being pivoted to one member at points removed from the hinge and guided to move longitudinally upon the other member as the case is opened and closed.

7. In an eyeglass-case, the combination with the two members hinged together at one edge, of a spring-arm having a laterally-extended end, a clip embracing said end and secured to one of the members, and a guide on the other member in which the spring-arm is longitudinally movable.

MORTIMER A. THREEHOUSE.

Witnesses:
G. WILLARD RICH,
G. A. RODA.